United States Patent [19]
Itou et al.

[11] Patent Number: 5,654,112
[45] Date of Patent: Aug. 5, 1997

[54] SOLID POLYELECTROLYTE BATTERY AND ITS METHOD OF MANUFACTURE

[75] Inventors: Tsukasa Itou, Sumoto; Masato Nishioka, Ibaragi; Tsutomu Sonozaki; Yasunobu Kodama, both of Mihara-gun, all of Japan

[73] Assignee: Sanyo Electric Co., Ltd., Osaka, Japan

[21] Appl. No.: 440,256

[22] Filed: May 12, 1995

[30] Foreign Application Priority Data

May 30, 1994 [JP] Japan ..................... 5-116834

[51] Int. Cl.⁶ ................ H01M 6/16; H01M 6/14; H01M 6/04; H01M 4/50
[52] U.S. Cl. ............. 429/192; 429/194; 429/196; 429/197; 429/198; 429/199; 429/218; 429/224
[58] Field of Search .................... 429/192, 194, 429/196, 197, 198, 199, 218, 224

[56] References Cited

U.S. PATENT DOCUMENTS

| | | | |
|---|---|---|---|
| 4,830,939 | 5/1989 | Lee et al. | 429/192 |
| 5,084,144 | 1/1992 | Reddy et al. | 205/104 |
| 5,169,736 | 12/1992 | Bittihn et al. | 429/194 |
| 5,409,786 | 4/1995 | Bailey | 429/199 |
| 5,474,860 | 12/1995 | Abraham et al. | 429/192 |
| 5,478,674 | 12/1995 | Miyasaka | 429/218 |

FOREIGN PATENT DOCUMENTS

| | | |
|---|---|---|
| 59-46765 | 3/1984 | Japan. |
| 60-150563 | 8/1985 | Japan. |

*Primary Examiner*—Kathryn L. Gorgos
*Assistant Examiner*—Edna Wang
*Attorney, Agent, or Firm*—Wenderoth, Lind & Ponack

[57] ABSTRACT

A novel structure and method of manufacture gives good electrode-polyelectrolyte electrical contact and superior solid polyelectrolyte battery capacity. Solid polyelectrolyte is sandwiched between a negative electrode active layer and a positive electrode active layer. A monomer composite gel of macromolecule compound, solute, and solvent is applied onto the positive electrode active layer, part of this monomer composite gel is impregnated into the positive electrode active layer, and the system is polymerized to yield a solid polyelectrolyte-positive electrode active layer laminate.

18 Claims, 2 Drawing Sheets

SOLID POLYELECTROLYTE BATTERY AND ITS METHOD OF MANUFACTURE

BACKGROUND OF THE INVENTION

This invention relates to a solid polyelectrolyte battery with solid polyelectrolyte disposed between a positive electrode active material layer and a negative electrode active material layer.

The lithium rechargeable battery has superior characteristics such as high energy density and long storage time due to little self discharge. These characteristics are utilized in power sources for watches, calculators, cameras, etc., and in backup power supplies for Integrated Circuits (IC's).

In general, the lithium battery uses a liquid electrolyte (electrolytic solution). However, prolonged use of a liquid electrolyte battery gives rise to problems of liquid leakage and loss of electrolyte through drying. These drawbacks do not exist for a lithium battery using a solid polyelectrolyte. Many electro-chemical devices from batteries to capacitors and electro-chromic displays take advantage of the characteristics of solid polyelectrolytes. Devices can be miniaturized and made lighter through the use of solid polyelectrolytes. Further, highly reliable devices with no liquid leakage can be provided using solid polyelectrolytes. For these reasons, solid polyelectrolyte research and development has become very active in recent years.

On the other hand, these superior solid polyelectrolyte characteristics not obtainable with a liquid electrolyte are offset by the difficulty in achieving good electrode contact when used in a battery. This is because solid polyelectrolyte does not flow like liquid electrolyte. Contact between the solid polyelectrolyte and an electrode affects battery performance. If good contact is not obtained, contact resistance between the solid polyelectrolyte and the electrode increases resulting in increased internal battery resistance. Further, poor solid polyelectrolyte to electrode contact restricts ion movement resulting in reduced battery capacity. Consequently, it is extremely important that the solid polyelectrolyte is in sufficient intimate contact with electrode active material layers in a battery using a solid polyelectrolyte.

To achieve this, the use of a positive electrode composite with solid polyelectrolyte added to the positive electrode active material is cited in Japanese Non-examined Patent Publication No. 2-40867 issued Feb. 9, 1990. In the battery cited in this disclosure, electrical contact between the solid polyelectrolyte and the positive electrode active material layer is improved by mixing a part of the solid polyelectrolyte with the positive electrode active material layer.

However, since the method cited in this disclosure layers solid polyelectrolyte on a positive electrode plate made with an electrode composite containing added solid polyelectrolyte, an ideal contact cannot be established between the positive electrode and the solid polyelectrolyte. In particular, when a solid polyelectrolyte layer with a rough surface is laminated onto the positive electrode active layer, poor contact results in effective reactive surface area variation from battery to battery, and a battery with sufficiently small internal resistance cannot be manufactured. Consequently, a solid polyelectrolyte battery with this construction has the drawback that maximum current cannot be increased, thereby making it difficult to increase battery capacity.

This invention was developed to eliminate these drawbacks. It is thus a primary object of the present invention to provide a solid polyelectrolyte battery and its method of manufacture wherein good electrical contact can be obtained between the solid polyelectrolyte and the positive electrode active layer. The above and further objects and features of this invention will more fully be apparent from the following detailed description with accompanying drawings.

SUMMARY OF THE INVENTION

The solid polyelectrolyte battery of this invention has solid polyelectrolyte disposed between a negative electrode active material layer and a positive electrode active material layer. Further, contact between the solid polyelectrolyte and the positive electrode active material layer is improved over prior art solid polyelectrolyte batteries by the novel structure described below. The solid polyelectrolyte which is laminated on the positive electrode active layer is a monomer composite that includes a macromolecular compound, a solute, and a solvent. This monomer composite is impregnated into the positive electrode active layer and polymerized. Part of the solid polyelectrolyte laminated on the positive electrode active layer is thereby impregnated into the positive electrode active layer and polymerized.

The method manufacture of this solid polyelectrolyte battery comprises impregnating the above mentioned monomer composite that includes a macromolecular compound, a solute, and a solvent into the positive electrode active layer. The monomer composite is subsequently polymerized to form the solid polyelectrolyte laminated on the positive electrode active layer.

The solid polyelectrolyte battery and its method of manufacture of this invention uses a monomer composite as the solid polyelectrolyte. The monomer composite is in gel form. The gel monomer composite on the positive electrode active layer not only provides the solid polyelectrolyte, but part of that monomer composite is also impregnated into the underlying positive electrode active layer. The monomer composite, part of which is impregnated into the underlying positive electrode active layer, is polymerized as a laminate on the positive electrode active layer to form the solid polyelectrolyte. This method of solid polyelectrolyte fabrication provides sufficient intimate contact between the positive electrode active layer and the solid polyelectrolyte layer. This provides extremely good electrical contact between the positive electrode and the solid polyelectrolyte and also increases the surface area of the monomer-positive electrode interface to significantly improve battery performance and characteristics.

DETAILED DESCRIPTION OF THE INVENTION

EMBODIMENT 1

Figure 1:
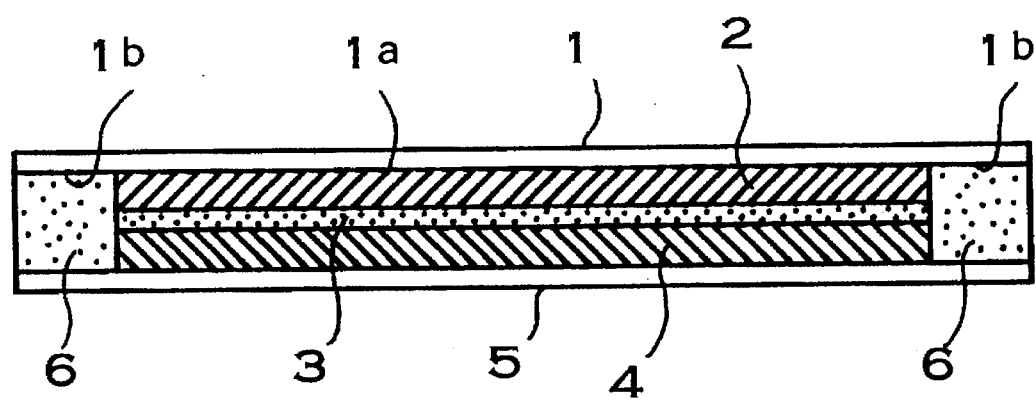
FIG. 1 is a cross-sectional view showing an embodiment of a solid polyelectrolyte battery.

FIG. 1 is a cross section of a solid polyelectrolyte battery in sheet form. In this figure, 1 is the positive electrode plate which is a metal foil formed from a metal such as aluminum, 2 is the positive electrode active material layer laminated on the surface of the positive electrode plate, 3 is the solid polyelectrolyte layer disposed between the positive electrode active material layer 2 and the negative electrode active material layer 4, 4 is the negative electrode active material layer, 5 is the negative electrode plate, and 6 is hot-melt sealant.

Spinel manganese, graphite, and ketchen-black are mixed in a 9:3:2 ratio by weight to make the positive electrode compound for the positive electrode active layer 2. Spinel manganese is made by firing lithium hydroxide with manganese carbonate. The positive electrode compound is mixed with a solution of polyvinylidene fluoride-N methyl pyrrolidone prepared in advance such as to make polyvinylidene-fluoride (PvdF) 5% by weight. In this manner a slurry with a viscosity of 1000 CPS is prepared.

The positive electrode active layer 2 is formed by applying the slurry described above onto the positive electrode plate 1 using the "Doctor Blade" method. The thickness of the positive electrode active layer 2 is made to be 100 μm. Further, as shown in FIG. 1, the positive electrode active layer 2 is applied to the positive electrode plate surface 1a leaving the outer perimeter edge of the positive electrode plate 1b without active material.

The negative electrode active layer 4 is lithium-aluminum prepared in an Ar+CO$_2$ (Ar:CO$_2$=80 liter:20 liter) gas mixture. The lithium-aluminum is 0.1% aluminum by weight. The negative electrode is made by pressure joining this negative electrode active layer 4 onto the negative electrode plate 5 which is hair-line processed stainless steel.

The solid polyelectrolyte layer 3 is a polymerized monomer composite which is urethane/ethylene glycol macromolecule compound (molecular weight 500), lithium boron tetrafluoride solute, and propylene carbonate solvent mixed in a 3:1:4 ratio by weight.

The ion conductivity of the solid polyelectrolyte, which is the polymerized monomer composite of the above components, is $2.0 \times 10^{-3}$ S/cm. Ion conductivity was measured by the complex impedance method on a polymerized thin film of monomer composite sandwiched between lithium metal.

The monomer composite in gel form is applied to the surface of the positive electrode active layer 2 and part of it is impregnated into the positive electrode active layer 2. After impregnation, the film thickness of monomer composite remaining on the surface of the positive electrode active layer 2 is adjusted to 25 μm. This 25 μm thick monomer composite layer becomes the solid polyelectrolyte 3 when polymerized. Next, both the monomer composite impregnated in the positive electrode active layer and the monomer composite layered on the surface of the positive electrode active layer are heated for thermal polymerization.

In this fashion, a sandwich of contacting layers of positive electrode plate, positive electrode active layer, solid polyelectrolyte, lithium aluminum, and negative electrode plate are laminated together. Finally, the outer edges of the positive and negative electrode plates 1,5 are sealed with hot-melt 6 to produce a solid polyelectrolyte battery in sheet form with the cross-sectional configuration shown in FIG. 1. The above description represents the first embodiment of the present invention.

EMBODIMENT 2

The solid polyelectrolyte is now changed as described below and the second embodiment of the solid polyelectrolyte battery is produced using the same positive electrode plate 1, positive electrode active layer 2, negative electrode active layer 4, and negative electrode plate 5 as the first embodiment.

The solid polyelectrolyte layer 3 is a polymerized monomer composite which is urethane/ethylene glycol macromolecule compound (molecular weight 500), lithium sulfonimide (LiN(CF$_3$SO$_2$)$_2$) solute, and propylene carbonate solvent mixed in a 3:1:4 ratio by weight. The ion conductivity of the solid polyelectrolyte, which is the polymerized monomer composite of these components, is $5.0 \times 10^{-3}$ S/cm. Ion conductivity was measured in the same manner as for the first embodiment.

The resulting monomer composite is laminated on the positive electrode active layer 2 to make the solid polyelectrolyte 3 in the same manner as the first embodiment. The monomer composite in gel form is applied to the surface of the positive electrode active layer 2 and part of it is impregnated into the positive electrode active layer 2. After impregnation, the film thickness of monomer composite remaining on the surface of the positive electrode active layer 2 is adjusted to 25 μm. This 25 μm thick monomer composite layer becomes the solid polyelectrolyte 3 when polymerized. Next, both the monomer composite impregnated in the positive electrode active layer and the monomer composite layered on the surface of the positive electrode active layer are heated for thermal polymerization.

In this fashion, a sandwich of contacting layers of positive electrode plate, positive electrode active layer, solid polyelectrolyte, lithium aluminum, and negative electrode plate are laminated together. Finally, the outer edges of the positive and negative electrode plates 1,5 are sealed with hot-melt 6 to produce a solid polyelectrolyte battery in sheet form with the cross-sectional configuration shown in FIG. 1.

EMBODIMENT 3

The solid polyelectrolyte is now changed as described below and the third embodiment of the solid polyelectrolyte battery is produced using the same positive electrode plate 1, positive electrode active layer 2, negative electrode active layer 4, and negative electrode plate 5 as the first embodiment.

The solid polyelectrolyte layer 3 is a polymerized monomer composite which is urethane/ethylene glycol macromolecule compound (molecular weight 500), lithium tri (trifluoromethanesulfoxyl)methide (LiC(CF$_3$SO$_2$)$_3$) solute, and propylene carbonate solvent mixed in a 3:1:4 ratio by weight. The ion conductivity of the solid polyelectrolyte, which is the polymerized monomer composite of these components, is $7.0 \times 10^{-3}$ S/cm as measured in the same manner as for the first embodiment.

The resulting monomer composite is laminated on the positive electrode active layer 2 to make the solid polyelectrolyte 3 in the same manner as the first embodiment. The monomer composite in gel form is applied to the surface of the positive electrode active layer 2 and part of it is impregnated into the positive electrode active layer 2. After impregnation, the film thickness of monomer composite remaining on the surface of the positive electrode active layer 2 is adjusted to 25 μm. This 25 μm thick monomer composite layer becomes the solid polyelectrolyte 3 when polymerized. Next, both the monomer composite impregnated in the positive electrode active layer and the monomer composite layered on the surface of the positive electrode active layer are heated for thermal polymerization.

In this fashion, a sandwich of contacting layers of positive electrode plate, positive electrode active layer, solid polyelectrolyte, lithium aluminum, and negative electrode plate are laminated together. Finally, the outer edges of the positive and negative electrode plates 1,5 are sealed with hot-melt 6 to produce a solid polyelectrolyte battery in sheet form with the cross-sectional configuration shown in FIG. 1.

EMBODIMENT 4

The solid polyelectrolyte is now changed as described below and the fourth embodiment of the solid polyelectrolyte battery is produced using the same positive electrode plate 1, positive electrode active layer 2, negative electrode active layer 4, and negative electrode plate 5 as the first embodiment.

The same solid polyelectrolyte layer 3 as the third embodiment is used. The monomer composite in gel form is applied to the surface of the positive electrode active layer 2 and part of it is impregnated into the positive electrode active layer 2 in the same manner as the first embodiment. After impregnation, the film thickness of monomer composite remaining on the surface of the positive electrode active layer 2 is adjusted to 25 μm. Without performing thermal polymerization, lithium aluminum and the negative electrode plate 5 layers are laminated in contact with the monomer composite film on the surface of the positive electrode active layer 2. Next, the monomer composite impregnated in the positive electrode active layer and the monomer composite layered on the surface of the positive electrode active layer 2 are thermally polymerized, and the outer edge of the negative electrode plate 5 is sealed with hot-melt 6 to produce a solid polyelectrolyte battery in sheet form with the cross-sectional configuration shown in FIG. 1. The method of solid polyelectrolyte battery manufacture of this fourth embodiment does not laminate the negative electrode active layer after thermal polymerization of the monomer composite as done in the method of the third embodiment. Rather, the method of this embodiment laminates the negative electrode active layer 4 on prior to thermal polymerization of the monomer composite.

COMPARATIVE EXAMPLE

Other than omitting impregnation of the monomer composite into the positive electrode active layer 2 as described below, a solid polyelectrolyte battery was manufactured in the same manner as the first embodiment using the same positive electrode plate 1, positive electrode active layer 2, negative electrode active layer 4, negative electrode plate 5, and monomer composite as the first embodiment.

Monomer composite with the same composition as for the first embodiment was applied as a 25 μm film on the surface of the negative electrode active layer 4 rather than the positive electrode active layer 2. The monomer composite was then thermally polymerized to form a solid polyelectrolyte laminate on the negative electrode active layer 4. Since the monomer composite is the same composition as that of the first embodiment, the polymerized monomer composite, which is the solid polyelectrolyte, has the same ion conductivity of $2.0\times10^{-3}$ S/cm as for the first embodiment. The positive electrode active layer 2 was layered onto the solid polyelectrolyte 3 on negative electrode active layer 4 laminate and a sandwich of contacting layers of positive electrode plate, positive electrode active layer, solid polyelectrolyte, lithium aluminum, and negative electrode plate were laminated together. Finally, the outer edges of the positive and negative electrode plates 1,5 were sealed with hot-melt 6 to produce a solid polyelectrolyte battery in sheet form with the cross-sectional configuration shown in FIG. 1.

Figure 2:
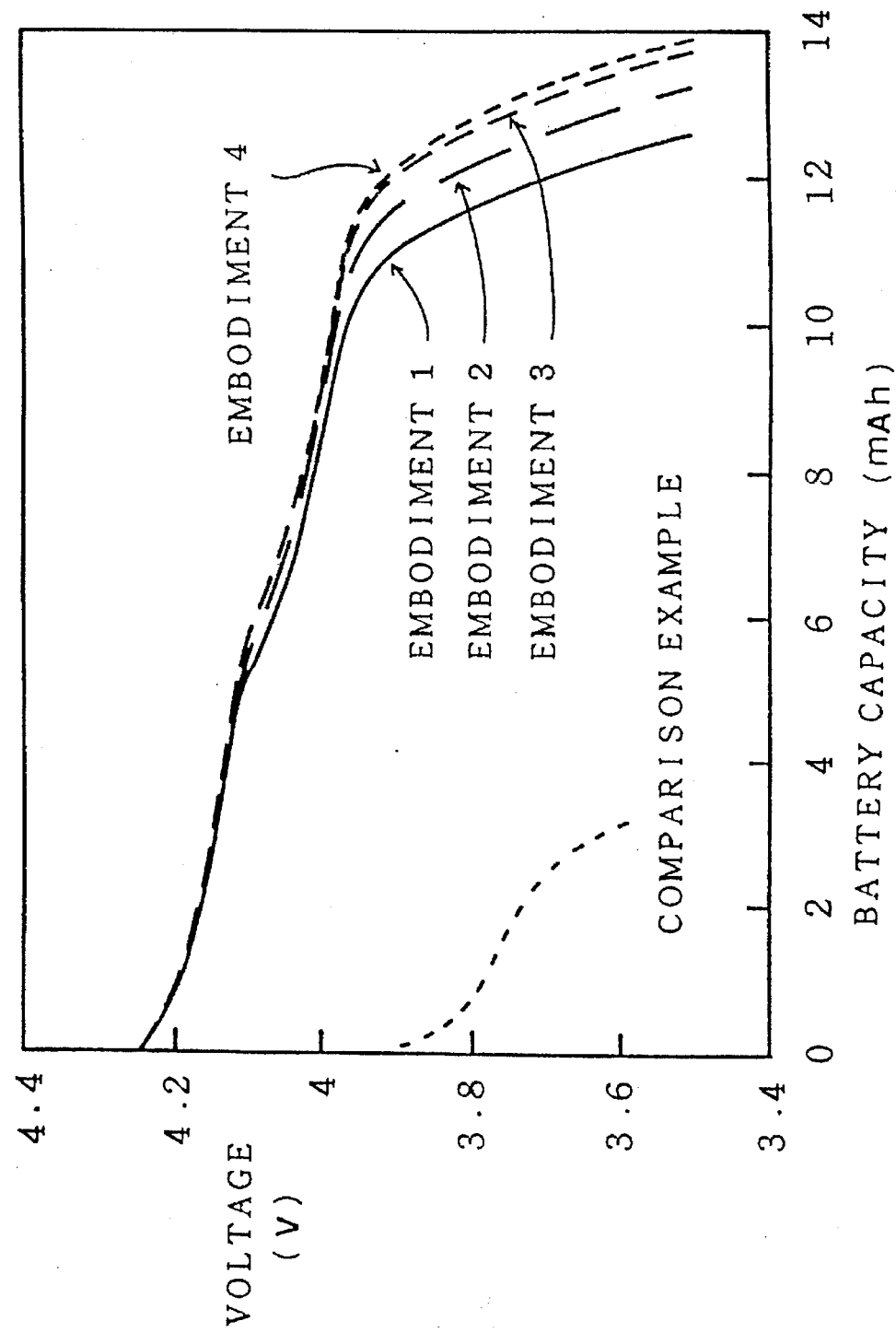
FIG. 2 is a graph showing voltage characteristics for solid polyelectrolyte battery embodiments of this invention and for a prior art battery for comparison.

Battery discharge curves for the solid polyelectrolyte batteries manufactured by the methods of the first, second, third, and fourth embodiments, as well as for a comparison example are shown in FIG. 2. This figure shows the voltage curves for solid polyelectrolyte battery prototypes at a constant current discharge of 0.05 mA/cm$^2$. As clearly shown in this figure, the solid polyelectrolyte battery embodiments of the present invention have excellent voltage characteristics and significantly more discharge capacity than the comparison example.

EMBODIMENT 5, 6 AND 7

The solid polyelectrolyte batteries of the previous embodiments use the manganese oxide system, spinel manganese for the positive electrode active layer 2. It is also possible to use cobalt oxide systems such as LiCoO$_2$ for the positive electrode active layer 2. Solid polyelectrolyte batteries identical to those of the first, second, and third embodiments, except that LiCoO$_2$ was used for the positive electrode active layer 2 instead of spinel manganese, were produced and their characteristics measured.

Results showed that a solid polyelectrolyte battery with a LiCoO$_2$ positive electrode active layer and the same urethane/ethylene glycol macromolecule compound, lithium boron tetrafluoride solute, and propylene carbonate solvent solid polyelectrolyte as the first embodiment had a discharge capacity of 12.4 mAh. This is the fifth embodiment.

A sixth solid polyelectrolyte battery embodiment with a LiCoO$_2$ positive electrode active layer and the same urethane/ethylene glycol, lithium sulfonimide (LiN(CF$_3$SO$_2$)$_2$), and propylene carbonate solid polyelectrolyte as the second embodiment had a discharge capacity of 13.1 mAh.

A seventh solid polyelectrolyte battery embodiment with a LiCoO$_2$ positive electrode active layer and the same urethane/ethylene glycol, lithium tri(trifluoromethanesulfoxyl)methide (LiC(CF$_3$SO$_2$)$_3$), and propylene carbonate solid polyelectrolyte as the third embodiment had a discharge capacity of 13.6 mAh.

EMBODIMENT 8, 9 AND 10

The manufacturing methods of the first through fourth embodiments used urethane systems for the macromolecule compound of the solid polyelectrolyte. However, the macromolecule compound of the solid polyelectrolyte of the present invention is not restricted to urethane systems. For example, similar results can be obtained for methacrylate or acrylate system monomers.

Solid polyelectrolyte batteries were produced by the same manufacturing methods as the first through third embodiments except that methacrylate/ethylene glycol was substituted for urethane/ethylene glycol as the macromolecule compound of the solid polyelectrolyte.

Results showed that a solid polyelectrolyte battery using methacrylate/ethylene glycol macromolecule compound, lithium boron tetrafluoride solute, and propylene carbonate solvent as the solid polyelectrolyte had a discharge capacity of 12.2 mAh. This is the eighth embodiment.

A ninth solid polyelectrolyte battery embodiment using methacrylate/ethylene glycol, lithium sulfonimide (LiN(CF$_3$SO$_2$)$_2$), and propylene carbonate as the solid polyelectrolyte had a discharge capacity of 13.2 mAh.

A tenth solid polyelectrolyte battery embodiment using methacrylate/ethylene glycol, lithium tri(trifluoromethanesulfoxyl)methide (LiC(CF$_3$SO$_2$)$_3$), and propylene carbonate as the solid polyelectrolyte had a discharge capacity of 13.6 mAh.

EMBODIMENT 11, 12 AND 13

Solid polyelectrolyte batteries were also produced by the same manufacturing methods as the first through third embodiments except that acrylate/ethylene glycol was substituted for urethane/ethylene glycol as the macromolecule compound of the solid polyelectrolyte.

Results showed that a solid polyelectrolyte battery using acrylate/ethylene glycol macromolecule compound, lithium boron tetrafluoride solute, and propylene carbonate solvent as the solid polyelectrolyte had a discharge capacity of 12.3 mAh. This is the eleventh embodiment.

A twelfth solid polyelectrolyte battery embodiment using acrylate/ethylene glycol, lithium sulfonimide ($LiN(CF_3SO_2)_2$), and propylene carbonate as the solid polyelectrolyte had a discharge capacity of 13.1 mAh.

A thirteenth solid polyelectrolyte battery embodiment using acrylate/ethylene glycol, lithium tri(trifluoromethanesulfoxyl)methide ($LiC(CF_3SO_2)_3$), and propylene carbonate as the solid polyelectrolyte had a discharge capacity of 13.6 mAh.

EMBODIMENT 14, 15 AND 16

Further solid polyelectrolyte batteries were produced by the same manufacturing methods as the first through third embodiments except that methacrylate/ethylene glycol was substituted for urethane/ethylene glycol as the macromolecule compound of the solid polyelectrolyte and $LiCoO_2$ was substituted for spinel manganese as the positive electrode active layer.

Results showed that a solid polyelectrolyte battery with a $LiCoO_2$ positive electrode active layer using a methacrylate/ethylene glycol, lithium boron tetrafluoride, and propylene carbonate solid polyelectrolyte had a discharge capacity of 12.2 mAh. This is the fourteenth embodiment.

A fifteenth solid polyelectrolyte battery embodiment with a $LiCoO_2$ positive electrode active layer and using a methacrylate/ethylene glycol, lithium sulfonimide ($LiN(CF_3SO_2)_2$), and propylene carbonate solid polyelectrolyte had a discharge capacity of 13.1 mAh.

A sixteenth solid polyelectrolyte battery embodiment with a $LiCoO_2$ positive electrode active layer and a methacrylate/ethylene glycol, lithium tri(trifluoromethanesulfoxyl)methide ($LiC(CF_3SO_2)_3$), and propylene carbonate solid polyelectrolyte had a discharge capacity of 13.7 mAh.

EMBODIMENT 17, 18 AND 19

Finally, solid polyelectrolyte batteries were produced by the same manufacturing methods as the first through third embodiments except that acrylate/ethylene glycol was substituted for urethane/ethylene glycol as the macromolecule compound of the solid polyelectrolyte and $LiCoO_2$ was substituted for spinel manganese as the positive electrode active layer.

Results showed that a solid polyelectrolyte battery with a $LiCoO_2$ positive electrode active layer using an acrylate/ethylene glycol, lithium boron tetrafluoride, and propylene carbonate solid polyelectrolyte had a discharge capacity of 12.2 mAh. This is the seventeenth embodiment.

An eighteenth solid polyelectrolyte battery embodiment with a $LiCoO_2$ positive electrode active layer and using an acrylate/ethylene glycol, lithium sulfonimide ($LiN(CF_3SO_2)_2$), and propylene carbonate solid polyelectrolyte had a discharge capacity of 13.1 mAh.

A nineteenth solid polyelectrolyte battery embodiment with a $LiCoO_2$ positive electrode active layer and an acrylate/ethylene glycol, lithium tri(trifluoromethanesulfoxyl)methide ($LiC(CF_3SO_2)_3$), and propylene carbonate solid polyelectrolyte had a discharge capacity of 13.5 mAh.

Table 1 lists the positive electrode active layer, solid polyelectrolyte macromolecule compound, solid polyelectrolyte solute, and discharge capacity of prototype solid polyelectrolyte batteries fabricated by embodiments 1 through 19.

TABLE 1

| | POSITIVE ELECTRODE ACTIVE LAYER | SOLID POLYELECTROLYTE | | DISCHARG CAPACITY (mAh) |
| --- | --- | --- | --- | --- |
| | | MACROMOLECULE COMPOUND | SOLUTE | |
| EMBODIMENT 1 | OXIDE OF A MANGANESE SYSTEM | URETHANE SYSTEM | $LiBF_4$ | 12.5 |
| EMBODIMENT 2 | OXIDE OF A MANGANESE SYSTEM | URETHANE SYSTEM | $LiN(CF_3SO_2)_2$ | 13.0 |
| EMBODIMENT 3 | OXIDE OF A MANGANESE SYSTEM | URETHANE SYSTEM | $LiC(CF_3SO_2)_3$ | 13.7 |
| EMBODIMENT 4 | OXIDE OF A MANGANESE SYSTEM | URETHANE SYSTEM | $LiC(CF_3SO_2)_3$ | 14.4 |
| EMBODIMENT 5 | OXIDE OF A COBALT SYSTEM | URETHANE SYSTEM | $LiBF_4$ | 12.4 |
| EMBODIMENT 6 | OXIDE OF A COBALT SYSTEM | URETHANE SYSTEM | $LiN(CF_3SO_2)_2$ | 13.1 |
| EMBODIMENT 7 | OXIDE OF A COBALT SYSTEM | URETHANE SYSTEM | $LiC(CF_3SO_2)_3$ | 13.6 |
| EMBODIMENT 8 | OXIDE OF A | METHACRYLATE | $LiBF_4$ | 12.2 |

TABLE 1-continued

| | POSITIVE ELECTRODE ACTIVE LAYER | SOLID POLYELECTROLYTE | | DISCHARG CAPACITY (mAh) |
|---|---|---|---|---|
| | | MACROMOLECULE COMPOUND | SOLUTE | |
| | MANGANESE SYSTEM | SYSTEM | | |
| EMBODIMENT 9 | OXIDE OF A MANGANESE SYSTEM | METHACRYLATE SYSTEM | $LiN(CF_3SO_2)_2$ | 13.2 |
| EMBODIMENT 10 | OXIDE OF A MANGANESE SYSTEM | METHACRYLATE SYSTEM | $LiC(CF_3SO_2)_3$ | 13.6 |
| EMBODIMENT 11 | OXIDE OF A MANGANESE SYSTEM | ACRYLATE SYSTEM | $LiBF_4$ | 12.3 |
| EMBODIMENT 12 | OXIDE OF A MANGANESE SYSTEM | ACRYLATE SYSTEM | $LiN(CF_3SO_2)_2$ | 13.1 |
| EMBODIMENT 13 | OXIDE OF A MANGANESE SYSTEM | ACRYLATE SYSTEM | $LiC(CF_3SO_2)_3$ | 13.6 |
| EMBODIMENT 14 | OXIDE OF A COBALT SYSTEM | METHACRYLATE SYSTEM | $LiBF_4$ | 12.2 |
| EMBODIMENT 15 | OXIDE OF A COBALT SYSTEM | METHACRYLATE SYSTEM | $LiN(CF_3SO_2)_2$ | 13.1 |
| EMBODIMENT 16 | OXIDE OF A COBALT SYSTEM | METHACRYLATE SYSTEM | $LiC(CF_3SO_2)_3$ | 13.7 |
| EMBODIMENT 17 | OXIDE OF A COBALT SYSTEM | ACRYLATE SYSTEM | $LiBF_4$ | 12.2 |
| EMBODIMENT 18 | OXIDE OF A COBALT SYSTEM | ACRYLATE SYSTEM | $LiN(CF_3SO_2)_2$ | 13.1 |
| EMBODIMENT 19 | OXIDE OF A COBALT SYSTEM | ACRYLATE SYSTEM | $LiC(CF_3SO_2)_3$ | 13.5 |

Further, discharge capacity is listed for prototype solid polyelectrolyte batteries fabricated in the same manner as embodiment 4 except that the positive electrode active layer, solid polyelectrolyte macromolecule compound, and solid polyelectrolyte solute are as given in Table 2 below.

TABLE 2

| | POSITIVE ELECTRODE ACTIVE LAYER | SOLID POLYELECTROLYTE | | DISCHARG CAPACITY (mAh) |
|---|---|---|---|---|
| | | MACROMOLECULE COMPOUND | SOLUTE | |
| EMBODIMENT 20 | OXIDE OF A MANGANESE SYSTEM | URETHANE SYSTEM | $LiN(CF_3SO_2)_2$ | 14.2 |
| EMBODIMENT 21 | OXIDE OF A MANGANESE SYSTEM | URETHANE SYSTEM | $LiBF_4$ | 14.0 |
| EMBODIMENT 22 | OXIDE OF A COBALT SYSTEM | URETHANE SYSTEM | $LiBF_4$ | 13.9 |
| EMBODIMENT 23 | OXIDE OF A COBALT SYSTEM | URETHANE SYSTEM | $LiN(CF_3SO_2)_2$ | 14.1 |
| EMBODIMENT 24 | OXIDE OF A COBALT SYSTEM | URETHANE SYSTEM | $LiC(CF_3SO_2)_3$ | 14.3 |
| EMBODIMENT 25 | OXIDE OF A MANGANESE SYSTEM | METHACRYLATE SYSTEM | $LiBF_4$ | 14.0 |
| EMBODIMENT 26 | OXIDE OF A MANGANESE SYSTEM | METHACRYLATE SYSTEM | $LiN(CF_3SO_2)_2$ | 14.3 |
| EMBODIMENT 27 | OXIDE OF A MANGANESE | METHACRYLATE SYSTEM | $LiC(CF_3SO_2)_3$ | 14.6 |

TABLE 2-continued

| | POSITIVE ELECTRODE ACTIVE LAYER | SOLID POLYELECTROLYTE MACROMOLECULE COMPOUND | SOLUTE | DISCHARG CAPACITY (mAh) |
|---|---|---|---|---|
| EMBODIMENT 28 | OXIDE OF A COBALT SYSTEM | METHACRYLATE SYSTEM | $LiBF_4$ | 13.9 |
| EMBODIMENT 29 | OXIDE OF A COBALT SYSTEM | METHACRYLATE SYSTEM | $LiN(CF_3SO_2)_2$ | 14.3 |
| EMBODIMENT 30 | OXIDE OF A COBALT SYSTEM | METHACRYLATE SYSTEM | $LiC(CF_3SO_2)_3$ | 14.5 |
| EMBODIMENT 31 | OXIDE OF A MANGANESE SYSTEM | ACRYLATE SYSTEM | $LiBF_4$ | 14.1 |
| EMBODIMENT 32 | OXIDE OF A MANGANESE SYSTEM | ACRYLATE SYSTEM | $LiN(CF_3SO_2)_2$ | 14.3 |
| EMBODIMENT 33 | OXIDE OF A MANGANESE SYSTEM | ACRYLATE SYSTEM | $LiC(CF_3SO_2)_3$ | 14.5 |
| EMBODIMENT 34 | OXIDE OF A COBALT SYSTEM | ACRYLATE SYSTEM | $LiBF_4$ | 14.0 |
| EMBODIMENT 35 | OXIDE OF A COBALT SYSTEM | ACRYLATE SYSTEM | $LiN(CF_3SO_2)_2$ | 14.2 |
| EMBODIMENT 36 | OXIDE OF A COBALT SYSTEM | ACRYLATE SYSTEM | $LiC(CF_3SO_2)_3$ | 14.3 |

As this invention may be embodied in several forms without departing from the spirit or essential characteristics thereof, the present embodiments are therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A solid polyelectrolyte battery consisting essentially of:
    a) a negative electrode active material layer;
    b) a positive electrode active material layer; and
    c) a solid polyelectrolyte layer which is provided between the negative electrode active material layer and the positive electrode active material layer, said polyelectrolyte being a polymerizable monomer composite in the form of a gel consisting of a macromolecular compound, a solute and a polymerizable solvent, and a part of which monomer composite is impregnated in and another part of which is coated on the positive electrode active material layer and is polymerized therein and thereon.

2. The solid polyelectrolyte battery as recited in claim 1 wherein the positive electrode active layer is an oxide of a manganese system.

3. The solid polyelectrolyte battery as recited in claim 2 wherein the positive electrode active layer contains an oxide of a manganese system which is a mixture of spinel manganese, graphite, and ketchen-black.

4. The solid polyelectrolyte battery as recited in claim 3 wherein the positive electrode active layer is an oxide of a manganese system containing polyvinylidene-fluoride (PvdF).

5. The solid polyelectrolyte battery as recited in claim 1 wherein the positive electrode active layer is an oxide of a cobalt system.

6. The solid polyelectrolyte battery as recited in claim 5 wherein the positive electrode active layer contains $LiCoO_2$.

7. The solid polyelectrolyte battery as recited in claim 1 wherein the macromolecule compound of the monomer composite is a urethane system.

8. The solid polyelectrolyte battery as recited in claim 7 wherein the macromolecule compound of the monomer composite is urethane/ethylene glycol.

9. The solid polyelectrolyte battery as recited in claim 7 wherein the macromolecule compound of the monomer composite is urethane/ethylene glycol, the solute is lithium boron tetrafluoride, and the solvent is propylene carbonate, and wherein this monomer composite mixture is polymerized.

10. The solid polyelectrolyte battery as recited in claim 1 wherein the macromolecule compound of the monomer composite is a methacrylate system.

11. The solid polyelectrolyte battery as recited in claim 10 wherein the macromolecule compound of the monomer composite is methacrylate/ethylene glycol.

12. The solid polyelectrolyte battery as recited in claim 10 wherein the macromolecule compound of the monomer composite is methacrylate/ethylene glycol, the solute is lithium boron tetrafluoride, and the solvent is propylene carbonate, and wherein this monomer composite mixture is polymerized.

13. The solid polyelectrolyte battery as recited in claim 1 wherein the macromolecule compound of the monomer composite is an acrylate system.

14. The solid polyelectrolyte battery as recited in claim 13 wherein the macromolecule compound of the monomer composite is acrylate/ethylene glycol.

15. The solid polyelectrolyte battery as recited in claim 13 wherein the macromolecule compound of the monomer composite is acrylate/ethylene glycol, the solute is lithium boron tetrafluoride, and the solvent is propylene carbonate, and wherein this monomer composite mixture is polymerized.

16. The solid polyelectrolyte battery as recited in claim 1 wherein the solute of the monomer composite is lithium boron tetrafluoride.

17. The solid polyelectrolyte battery as recited in claim 1 wherein the solute of the monomer composite is lithium sulfonimide ($LiN(CF_3SO_2)_2$).

18. The solid polyelectrolyte battery as recited in claim 1 wherein the solute of the monomer composite is lithium tri(trifluoromethanesulfoxyl)methide ($LiC(CF_3SO_2)_3$).

* * * * *